(12) United States Patent
Babakhan et al.

(10) Patent No.: US 9,811,435 B2
(45) Date of Patent: Nov. 7, 2017

(54) SYSTEM FOR VIRTUAL MACHINE RISK MONITORING

(71) Applicant: Cisco Technology, Inc., San Jose, CA (US)

(72) Inventors: Andrew Babakhan, Chatswood (AU); Jeffrey Zhou, Chatswood (AU); Neale Rowe, Chatswood (AU); Peter Leung, Chatswood (AU)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 14/016,937

(22) Filed: Sep. 3, 2013

(65) Prior Publication Data

US 2015/0067143 A1    Mar. 5, 2015

(51) Int. Cl.
*G06F 11/30*    (2006.01)
*H04L 29/06*    (2006.01)

(52) U.S. Cl.
CPC ........ *G06F 11/301* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 9,021,307 B1 * | 4/2015 | Parameswaran | G06F 11/008 714/37 |
| 9,135,031 B1 * | 9/2015 | Knight | G06F 9/455 |
| 9,146,763 B1 * | 9/2015 | Mehat | G06F 9/45533 |
| 9,167,028 B1 * | 10/2015 | Bansal | H04L 43/50 |
| 2004/0078727 A1 * | 4/2004 | Little et al. | 714/48 |
| 2006/0259361 A1 * | 11/2006 | Barhydt et al. | 705/14 |
| 2009/0172666 A1 | 7/2009 | Yahalom et al. | |
| 2010/0268816 A1 * | 10/2010 | Tarui | H04L 12/00 709/224 |
| 2010/0332889 A1 * | 12/2010 | Shneorson et al. | 714/2 |
| 2012/0089980 A1 * | 4/2012 | Sharp | G06F 9/45558 718/1 |
| 2012/0284313 A1 * | 11/2012 | Dunne | G06F 11/0718 707/813 |
| 2013/0019243 A1 * | 1/2013 | Schmidt | G06F 9/5077 718/1 |
| 2013/0044764 A1 * | 2/2013 | Casado | H04L 12/66 370/401 |
| 2013/0055246 A1 | 2/2013 | Li et al. | |

(Continued)

FOREIGN PATENT DOCUMENTS

EP    2284775 A2    2/2011

OTHER PUBLICATIONS

International Search Report and Written Opinion in counterpart International Application No. PCT/US2014/053253, mailed Jan. 8, 2015, 13 pages.

(Continued)

*Primary Examiner* — Ninos Donabed (57) ABSTRACT

A virtual machine may allow execution of applications decoupled from physical hardware. The virtual machine may be executed by the physical hardware in a data center. A system can monitor and assess performance and reliability of the virtual machine based on device records of network components of the data center that are supporting operation of the virtual machine.

20 Claims, 9 Drawing Sheets

(56) References Cited

U.S. PATENT DOCUMENTS

2014/0068602 A1* 3/2014 Gember .............. G06F 9/45558
718/1
2014/0201733 A1* 7/2014 Benny et al. ..................... 718/1
2014/0351394 A1* 11/2014 Elisha ................ H04L 41/0806
709/222

OTHER PUBLICATIONS

Liu, et al., "VMRaS: A Novel Virtual Machine Risk Assessment Scheme in the Cloud Environment," 2013 IEEE International Conference on Services Computing, Jun. 28, 2013, pp. 384-391.
VMware, "VMware vCenter Operations Manager Advanced Getting Started Guide," Jan. 2012, retrieved from http://www.vmware.com/pdf/vcops-5-getting-started-guide.pdf, on Dec. 8, 2014, 66 pages.

* cited by examiner

| Port | Adapter | Owner | Mod Host |
|---|---|---|---|
| Veth2 | Net Adapter 1 | MS Exchange | 3 10.67.82.37 |
| Veth3 | Net Adapter 1 | SQL DB | 3 10.67.82.37 |
| Veth4 | Net Adapter 1 | Win2K8-1 | 3 10.67.82.37 |
| Veth5 | Net Adapter 1 | Win2K8-2 | 3 10.67.82.37 |
| Veth7 | Net Adapter 1 | Win2K8-3 | 3 10.67.82.37 |

Module 3:
- VM Name: SQL DB
- Guest OS: Microsoft Windows Server 2008 R2 (64-bit)
- Power State: Powered On
- VM Uuid: 4200c705-a4b5-1342-3479-463f7c5xba1
- Virtual CPU Allocated: 1
- CPU Usage: 0%
- Memory Allocated: 4096 MB
- Memory Usage: 2%
- VM FT State: Unknown
- Tools Running status: Not Running
- Tools Version status: Not installed
- Data Store: datastore1 (1)
- VM Uptime: 1 month 16 days 1 hour 5 minutes

| VM-Name | Src Mod | Dst Mod | Start-Time | Completion-Time |
|---|---|---|---|---|
| MS Exchange | 3 | 4 | Tue May 14 11:54:14 2013 | Tue May 14 11:54:25 2013 |
| SQL DB | 3 | 6 | Tue May 14 11:54:14 2013 | Tue May 14 11:54:25 2013 |

SYSTEM FOR VIRTUAL MACHINE RISK MONITORING

FIELD

The present disclosure relates to data centers and more specifically, to selection of nodes in the data center for virtual machines.

BACKGROUND

A virtual machine may allow execution of applications decoupled from physical hardware. The virtual machine may execute on the physical hardware in a data center. The virtual machine may execute business critical applications. Hence, health of the virtual machine may be critical for business continuity.

DESCRIPTION OF EXAMPLE EMBODIMENTS

Overview

By way of introduction, the example embodiments described below include a device and method to provide monitoring of risk or reliability of a virtual machine.

According to a first aspect, a device may include a virtual machine detector which determines identity information of a virtual machine residing in a data center. The device may also include a network detector to determine identity information of network devices comprising a network segment, and store in memory the identity information of the network devices. The identity information of the network devices may be associated with the identity information of the virtual machine. The device may also include a reliability calculator to determine a risk level of the virtual machine based on the identity information of the network devices. An output device may report the calculated risk level of the virtual machine.

In a second aspect, a method is provided that may identify a plurality of virtual machines being executed in a data center. The method may further identify a virtual machine path within the data center used by a virtual machine from among the virtual machines and further identify a plurality of network components in the virtual machine path. The method may further record the virtual machine and the corresponding virtual machine path in a virtual machine database for later access.

In a third aspect, a non-transitory computer readable media comprising instructions executable by a processor is provided. The non-transitory computer readable media may store instructions to identify a virtual machine path being used by a virtual machine executed by a node of a data center. The instructions may determine stability of the virtual machine based on device records of devices in the virtual machine path and monitor a change in the stability of the virtual machine. There may further be instructions to report the change in the stability via an output device.

Further aspects and advantages are discussed below in conjunction with the example embodiments.

Example Embodiments

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

Figure 1:
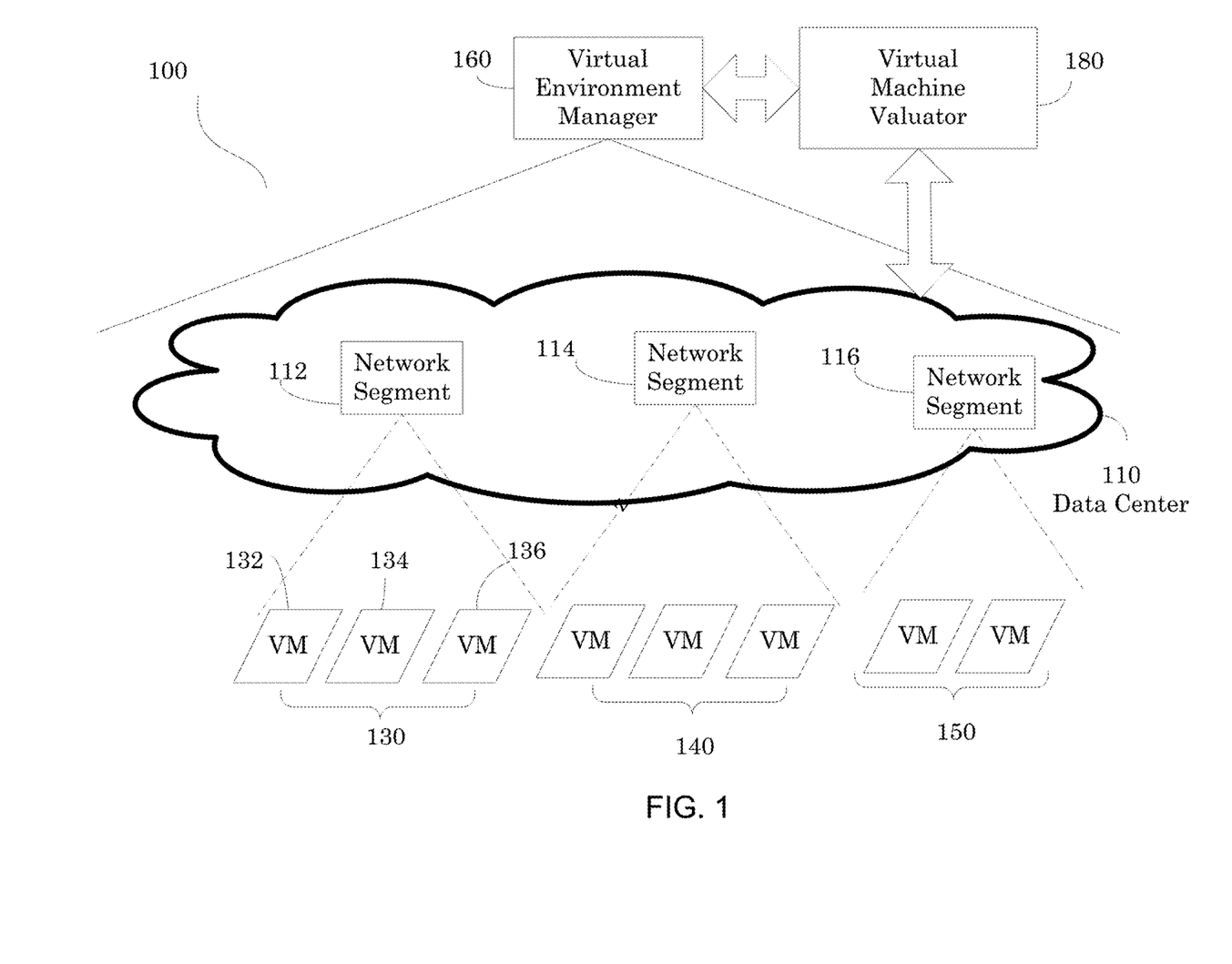
FIG. 1 is an example block diagram of system for virtual machine risk monitoring.

FIG. 1 is a block diagram of an example system 100 for virtual machine risk monitoring. The system 100 may include a data center 110 with one or more network segments 112, 114, and 116, multiple sets of virtual machines 130, 140, and 150, a virtual environment manager 160, and a virtual machine valuator 180. Each set of virtual machines, such as 130, may include one or more virtual machines such as 132, 134, and 136. In other examples, a fewer or greater number of sets of virtual machines and virtual machines may be included.

Figure 2:
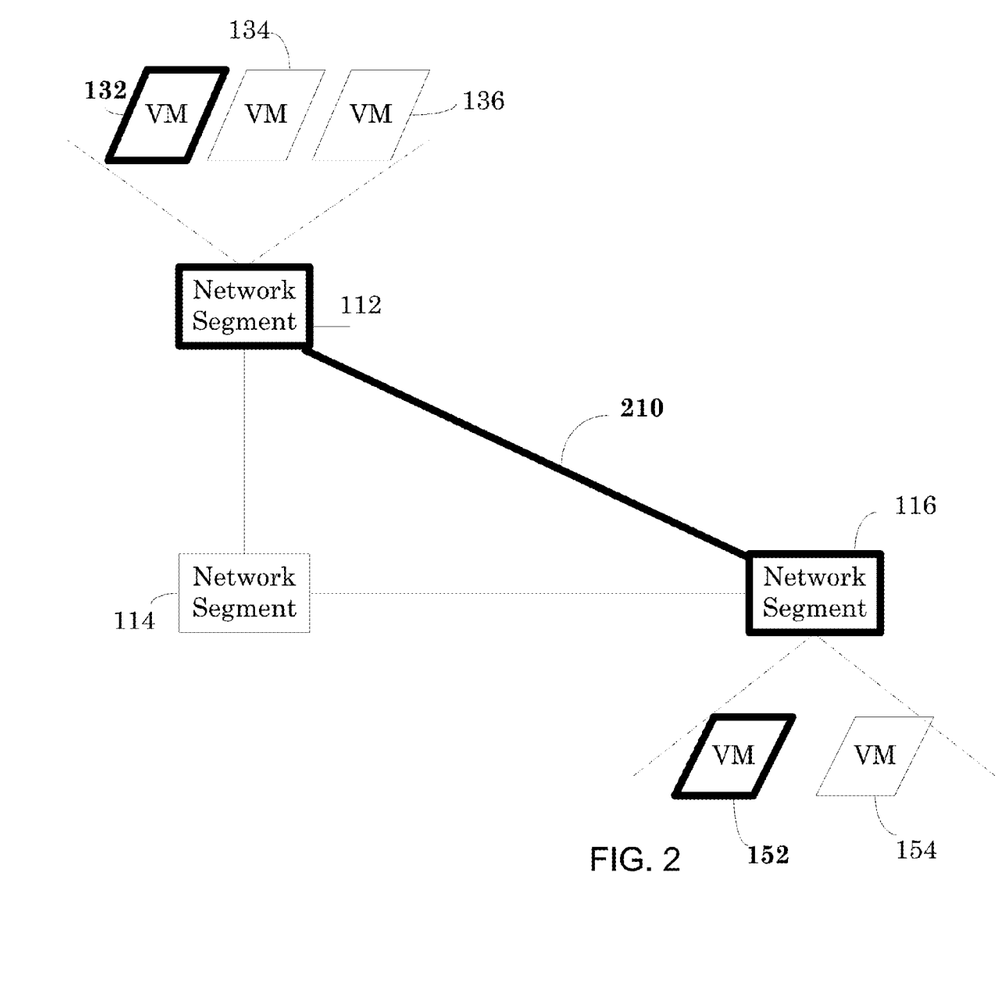
FIG. 2 is an example block diagram of a data center illustrating a virtual machine path.

The data center 110 may include computer systems, peripherals and network components, such as telecommunications and storage systems and may include redundant or backup power supplies, redundant data communication connections, environmental controls, security devices and other data center related devices and systems. The data center 110 may be a cloud server(s) or a virtualization solution or any other system(s) that may execute a virtual machine (VM) such as the virtual machine 132. The virtual machine 132 may be hardware, upon which a software implemented abstraction of the virtual machine 132 executes. The virtual machine 132 may be assigned to use particular network elements of the data center 110. Network elements may also be referred to as network components or network devices and may include the likes of switches, routers, cables, computer terminals, servers or any other hardware or software device used in the data center. The hardware constituting the network elements assigned to the virtual machine 132 may be referred to as the network segment 112. The network segment may also be referred to as a data center module, or a data center node. The network segment, such as network segment 112, may include physical network elements or hardware of the data center 110. The network elements may include devices such as computer terminals, servers, network switches, network interface cards, storage devices, cables, routers, and other such devices enabling communication, storage and/or computation of data. The network segment 112 may execute more than one virtual machine, such as the virtual machines 132, 134, and 136. The virtual machines 132-136, being executed by the network segment 112, may be referred to as the virtual machine set 130. The data center 110 may include more network segments such as 114 and 116 each assigned to execute respective virtual machine sets 140 and 150. Further, as shown in FIG. 2 the virtual machine 132 may communicate data with another virtual machine, such as virtual machine 152 from the network segment 116. The virtual machine 132 may also communicate with a virtual machine on the same network segment as the virtual machine 132, such as the virtual machine 134. The network elements of the data center 110 involved in the data communication between the two or more virtual machines may be referred to as a virtual machine path. For example, the virtual machine 132 may involve a web-based application that uses a database stored on the virtual machine 152 resulting in communication of data via the virtual machine path 210 (shown in bold). The virtual machine 132 may be involved in any number of virtual machine paths. The virtual machine path 210 may indicate interconnection or cooperation between applications being run on the virtual machine 132 and the virtual machine 152. The virtual machine path 210 may also indicate dependency of one of the virtual machines 132 and 152 on another. Alternately, the virtual machine 132 may not be part of any virtual machine path.

The virtual environment manager 160 may be a device that manages virtualization to administrate, manage and configure virtual machines among the hardware in the data center 110. The virtual environment manager 160 may be a data center switch capable of extending a network edge to a hypervisor and the virtual machines included in the virtual machine sets 130-150. The hypervisor may be computer software, firmware or hardware that creates and runs the virtual machine 132. The hypervisor may be provided by vendors of virtual machine software such as Oracle VM Server for SPARC, Oracle VM Server for x86, the Citrix XenServer, VMware ESX/ESXi or any other hypervisor vendor. Each of the network segments 112-116 may include a hypervisor that manages and creates virtual machines executed in that segment. The virtual environment manager 160 may be integrated with each of the hypervisors to obtain information related to the virtual machines executed on the corresponding network segment. The virtual environment manager 160 may be a hypervisor agnostic device capable of integrating with hypervisors provided by several vendors in the market. Alternatively, the virtual environment manager 160 may work with a particular brand and/or version of a hypervisor.

Figure 3:
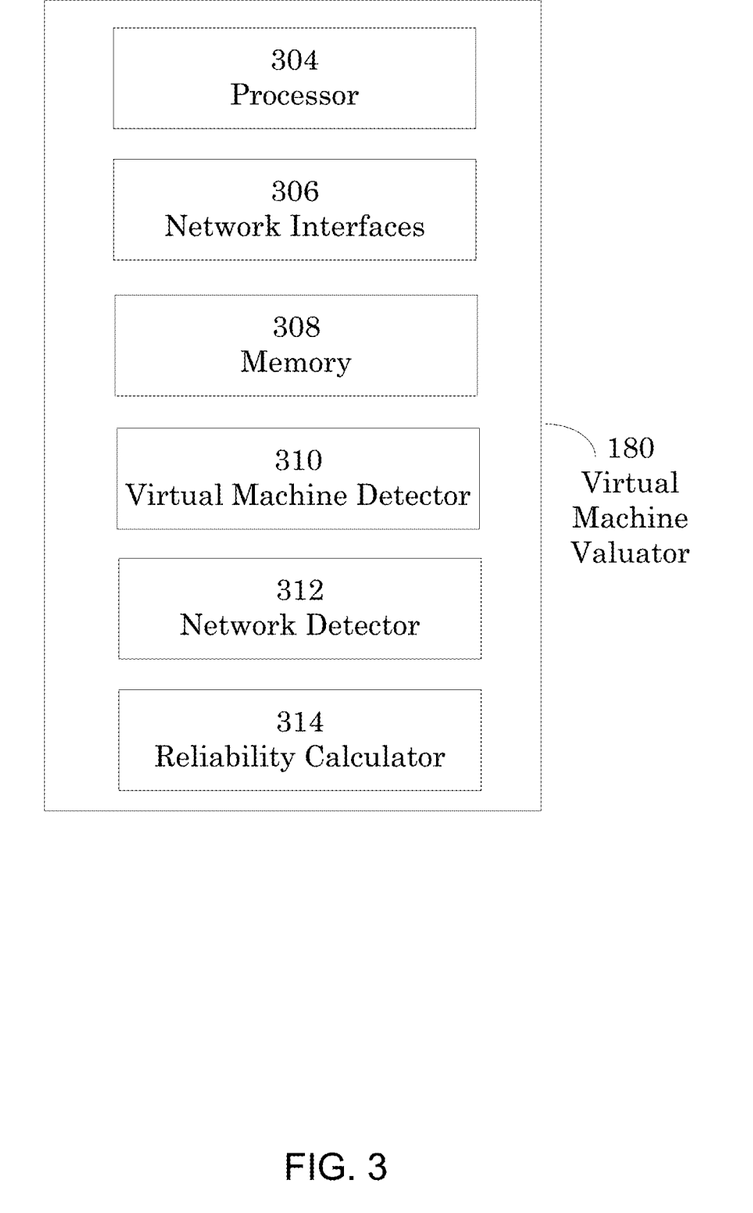
FIG. 3 is an example block diagram of a virtual environment manager.

The virtual machine valuator 180 may be a device that coordinates information related to the virtual machines 130-150 and the physical network devices or components in the data center 110. The virtual machine valuator 180, as shown in FIG. 3, may include a processor 304, one or more network interfaces 306, a memory 308, a virtual machine detector 310, a network detector 312, and a reliability calculator 314. Each module described herein, such as the virtual machine detector 310, the network detector 312, and the reliability calculator 314, is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each unit may include only memory storing instructions executable with the processor 304 to implement the features of the corresponding module without the module including any other hardware. Because each module includes at least some hardware, even when the included hardware includes software, each module may be interchangeably referred to as a hardware unit, such as the virtual machine detector hardware unit, the reliability calculator hardware unit, and the network detector hardware unit.

The processor 304 may perform tasks of the virtual machine valuator 180 and control the operation of the virtual machine valuator 180. The processor 304 may be a microprocessor, a digital signal processor, a graphics processing unit, or any other processing unit capable of executing computer readable instructions. The processor 304 may be an x86 based processor or an ARM based processor or may employ any other processor architecture. The processor 304 may be a single core or a multi-core processor. The processor 304 may be a serial processor or a parallel processor.

The network interfaces 306 may enable communication between the virtual machine valuator 180 and the data center 110. The virtual machine valuator 180 may communicate with other devices (not shown) via the network interfaces 306. A network interface provided by the network interfaces 306 may be capable of receiving and transmitting data over a network. The network interface may include or be an embedded component, such as part of a circuit board, a computer mother board, a router, an expansion card, a printer interface, a USB (universal serial bus) device, or a part of any other hardware. The communication may be via a wired or a wireless communication medium. The network interface may utilize any protocol of 3G/4G/EDGE/4G LTE, Bluetooth®, WiMax®, GPRS, UMTS, HSDPA, HSPA or any other protocol or any combination thereof. The network interface may be capable of switching between one communication medium and another communication medium seamlessly without interruption of communication.

Figure 5:
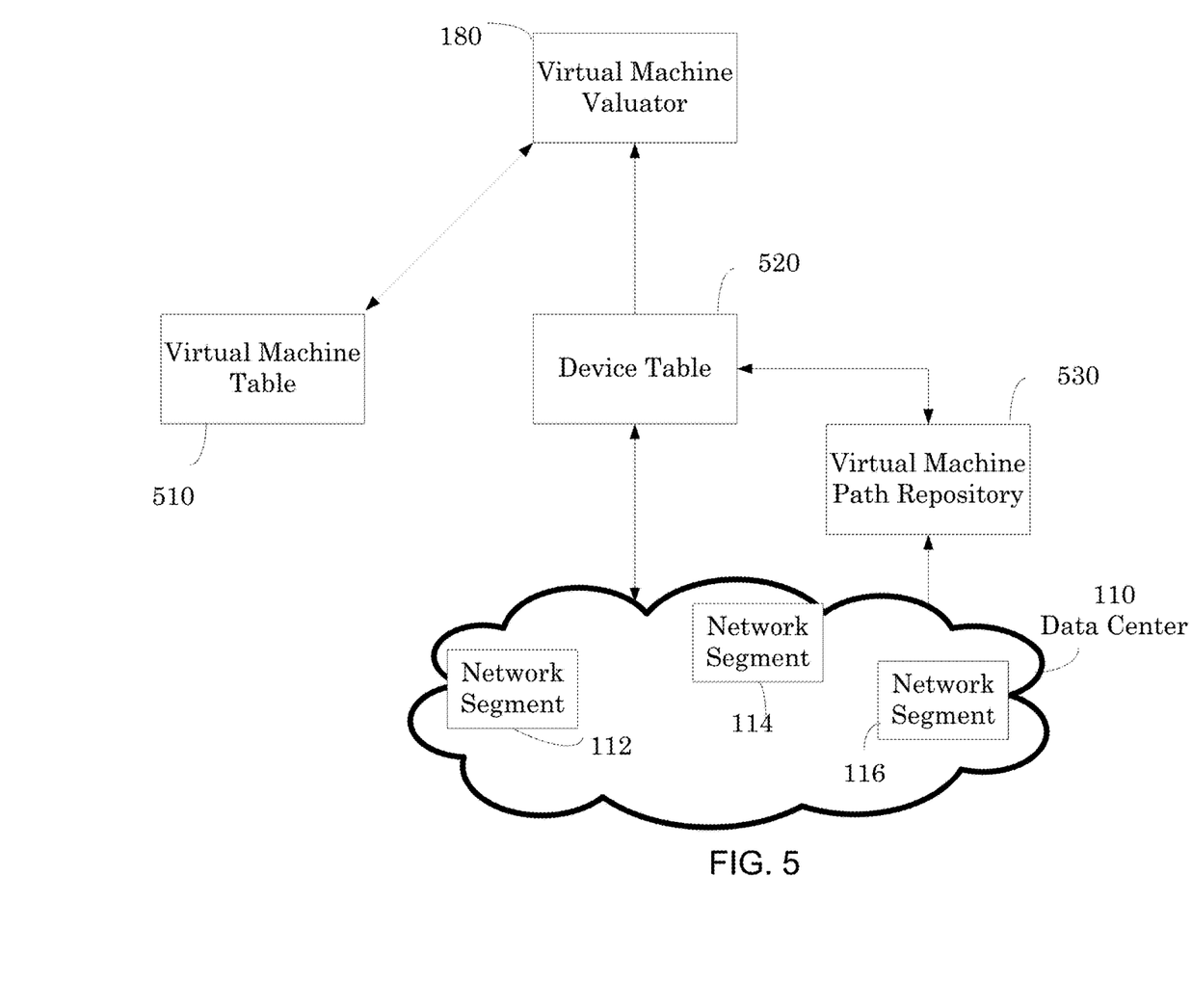
FIG. 5 is a block diagram illustrating an example data flow in a system for virtual machine risk monitoring.

The memory 308 may be a non-transitory memory storage device and may include instructions executable by the processor 304 or the other units of the virtual machine valuator 180. The memory 308 may be volatile memory and/or non-volatile memory or a cache memory such as a random access memory (RAM), or flash memory. Alternatively or in addition, the memory 308 may include an optical, magnetic (hard-drive) or any other form of data storage device. The memory 308 may store data related to the operation of the virtual machine valuator 180 such as a virtual machine table 510, a device table 520, a virtual machine path repository 530, such as shown in FIG. 5. The memory 308 may further store information used by programmable interfaces such as network programmable application programming interfaces which connect to the network devices. The programmable interfaces may request and receive information regarding data paths by conducting neighbor discovery processes. The programmable interfaces may also collect information regarding the network devices such as serial numbers, device names and other information associated with the network devices. Alternately, the virtual machine table 510, the device table 520, and the virtual machine path repository 530 may be stored in a memory storage device in a separate memory accessible by the virtual machine valuator 180. The separate memory may be, for example, included in a central server. Alternately, or in addition, the separate memory may include memory within one of the network devices, such as a router, in the data center.

Figure 4A:
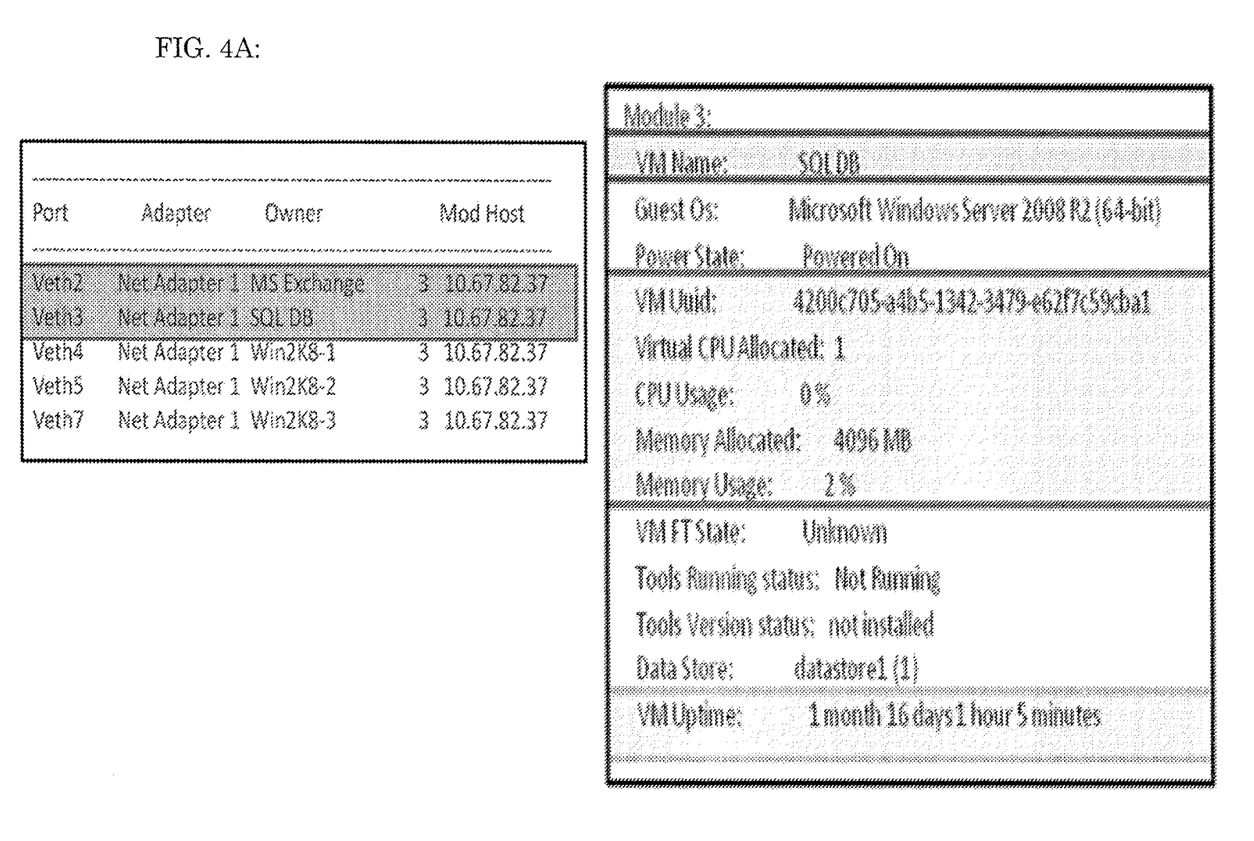
FIG. 4A, FIG. 4B, and FIG. 4C illustrate examples of information regarding a virtual machine.
Figure 4B:
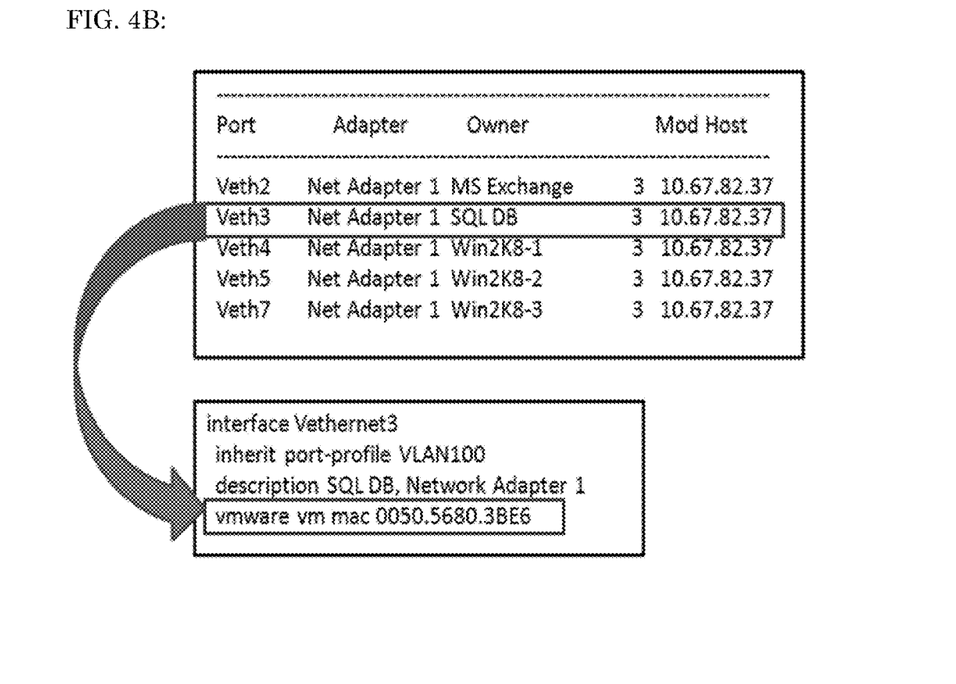

The virtual machine detector 310 may identify and/or gather virtual machine information (VM information) related to the virtual machine 132. The virtual machine detector 310 may generate and update the virtual machine table 510. The virtual machine detector 310 may associate the virtual machine 132 with virtual Ethernet modules used by the virtual machine 132. The VM information may include virtual machine name, virtual Ethernet ID, virtual Ethernet module (VEM) ID, internet protocol (IP) address of VEM, and other such information associated with the virtual machine 132. The VM information may be analyzed to determine an application being executed in the virtual machine 132. The VM information may be further analyzed to determine an operating system, processor and/or memory usage, and a universally unique identifier (UUID) which could be used for granular tracking of virtual machine identity. The virtual machine detector 310 may filter available VM information to collect only particular fields of information. FIG. 4A shows example VM information. The virtual machine detector 310 may also obtain a media access control (MAC) address of the virtual machine 132. The virtual machine MAC address may be obtained by querying one of the information fields from the VM information, such as the VEM ID. The virtual machine table 510 may record a mapping between the VM information and the VEM ID via the virtual machine MAC address as shown in FIG. 4B. The virtual machine table 510 may provide a binding between the virtual machine name and the virtual machine identifier, such as the virtual machine MAC address. Alternately, or in addition, the virtual machine table 510 may provide a binding between the application on the virtual machine 132 and the virtual machine MAC address. Thus, the virtual machine table 510 may be accessed to determine information relevant to the virtual machine 132 or the application executing on the virtual machine 132. The VM information may be obtained by the virtual machine detector 310 by using frameworks through network protocol messages, such as NETCONF protocol messages defined in RFC4741. Obtaining the information may involve using programming languages such as Java, Python, C or any other programming language that may be used to send and receive the network protocol messages. Alternately or in addition, the VM information may be obtained via a programming interface with direct connection to the hypervisor or a hypervisor manager. A hypervisor manager may enable managing one or more hypervisors operational at a server in the data center. The one or more hypervisors being managed by the hypervisor manager may or may not be of the same type. For example, the hypervisor manager may manage a first hypervisor from vendor 1 and a second hypervisor from vendor 2. The programming interfaces for this method may use web services via application programming interfaces or any other such technology enabling development of an interface that interoperates with the hypervisor or the hypervisor manager. The virtual machine detector 310 may obtain the VM information irrespective of the vendor of the virtual machine.

In an example, the virtual machine detector 310 may send a message to the virtual environment manager 160, the message containing a request for a list of the virtual machines operational in the data center 110. In response, the virtual environment manager 160 may inspect each virtual Ethernet interface associated with one of the virtual machines. The inspection may be performed recursively. The virtual environment manager 160 may determine the virtual machine MAC address associated with each virtual machine associated with a respective virtual Ethernet interface. The virtual environment manager 160 may further obtain the VM information corresponding to each virtual machine from the corresponding hypervisor. The virtual environment manager 160 may collate the information regarding a virtual Ethernet interface, the corresponding virtual machine MAC address, and VM information associated with the corresponding virtual machine. The virtual machine detector 310 may receive the collated information in response to the request. In another example, the virtual machine detector 310 may receive the VM information regarding each virtual machine in separate packets. The VM information may be transferred in form of XML structures, or any other format. In another example, the VM information may be compressed before transmission and uncompressed by the virtual machine detector 310. In yet another example, the VM information may be encrypted before transmission. The virtual machine detector 310 may decrypt the VM information received.

The virtual machine detector 310 may also identify an application associated with the virtual machine 132 through the naming convention of the virtual machine 132. The VM information may also be analyzed to determine any errors in virtual machine configuration or errors in execution of the application on the virtual machine 132. A cause for such errors may also be determined, for example, the virtual machine 132 may consistently be using large amounts of memory leading to longer processing times or execution errors. The fields in the VM information may be used to identify common latency/delay symptoms indicative of virtual machine health. The VM information may also be indicative of network health associated with a virtual machine. In addition, fields from the VM information, such as the UUID field, may provide granular identification of the virtual machine. The granular identification of the virtual machine may further be obtained from the virtual machine name and other such fields in the VM information. The VM information collected may be cached by the virtual machine detector 310 in the virtual machine table 510. The virtual machine table 510 may be structured, for example to contain an entry per virtual machine. The entry may identify the virtual machine 132 by a unique identifier such as the virtual machine name, or the virtual machine MAC address, or the virtual Ethernet ID or any other such VM information field.

The network detector 312 may identify and/or gather information related to a network component or network device involved in execution of the virtual machine 132. The device may be layer 2 device. The device may also be involved in the virtual machine path 210 being used by the virtual machine 132. The network detector 312 may update the device table 520. The network detector 312 may determine the network elements involved in executing the virtual machine 132 by traversing a data path used by data transmissions to and/or from the virtual machine 132. The network detector 312 may use network programmability through application programming interfaces such as Cisco ONEPK, to retrieve Layer 2 device connections in a communication path by performing a neighbor discovery at every network hop. A network hop may be a physical network device or a virtual network device in the data center 110. The neighbor discovery may involve hop by hop querying of the network devices along the data path of the virtual machine 132. The network detector 312 may further determine forwarding information per hop, such as by accessing or requesting layer 2 unicast information available at each hop. The forwarding table may be derived from either Layer 2 unicast routing information base (RIB) and/or a dynamic mac address table which maps the source mac addresses to each port. The data center 110 may be a Layer 2 infrastructure with each network device in the data center 110 maintaining corresponding forwarding decisions in content addressable memory tables or Ternary Content Addressable memory. The network detector 312 may query each network hop for the respective forwarding information to identify the virtual machine path 210. Additionally, the network hops may also contain additional Layer 3 to Layer 2 adjacency information from sources such as the Address Resolution Protocol (ARP) table to further identify virtual machine demarcation of the Layer 3 network devices operating the virtual machine 132. The forwarding information at each hop may provide the next hop device assigned to forward data directed to an address of the virtual machine 132. The address of the virtual machine 132 may be correlated with the virtual machine table 510 and the next hop device may be associated with the virtual machine path 210 of the virtual machine 132. The entire virtual machine path 210 may be identified by accessing a Layer 2 unicast table at each next hop device identified in this manner. Alternately, the network detector 312 may identify the virtual machine path 210 by a two stage process. In a first phase, the network detector 312 may query the network devices as per the neighbor discovery process and generate a network tree identifying the network devices in the data center 110. In a second phase, the network detector 312 may identify the network devices in the virtual machine path 210 by correlating the virtual machine MAC address of the virtual machine 132 against the Layer 2 unicast forwarding tables of the network devices to identify the network devices that is on the virtual machine path 210. The virtual machine MAC address may be obtained from the virtual machine table 510. The identified virtual machine path 210 may be stored in the virtual machine path repository 530 for later use. The network detector 312 may perform such virtual machine path detection for each of the virtual machines in the data center 110 and store the detected virtual machine paths in the virtual machine data path repository 530. Alternately, the virtual machine path 210 may be detected on demand.

Alternately, the network detector 312 may determine the virtual machine path 210 by leveraging network programmability to monitor data packets arriving at ingress interfaces of the data center 110. For example, the Cisco ONEPK may provide data path service sets that allow monitoring of data packets. A data packet arriving at an ingress interface may be replicated. The replica may be analyzed to match an identifier, such as the MAC address or IP address, contained in the replicated packet with the VM information contained in the virtual machine table 510. Based on the matching process, the network detector 312 may identify data packets to and/or from the virtual machine 132. Thus, the network detector 312 may determine the network devices or network components involved in execution of the virtual machine 132 based on the correlation of the virtual machine table 510 with contents of a header of the data packet, such as source/destination address. The identified virtual machine path 210 may also be stored in a virtual machine path repository 530. Alternately, the virtual machine path 210 may be stored in the virtual machine path repository 530 when the virtual machine 132 was initially configured. The network detector 312 may, thus, determine the virtual machine path 210 by accessing the virtual machine path repository 530.

The virtual machine path 210 may be a list of network devices along a communication path for transmission of data between the virtual machine 132 and the virtual machine 152. The virtual machine path 210 may involve network devices in the data center 110. An example virtual machine path 210 may provide identification information of the network devices involved in the data communication. For example, the virtual machine path 210 may include identification of a network switch, a server, a router, a firewall and other such network devices involved in data communication between the virtual machines 132 and 152. The network devices identified in the virtual machine path 210 may be virtual network devices. The virtual machine path 210 may further involve identification of a port, a network interface card, and other such network devices. Alternately, in an example, the virtual machine path 210 may be a list of data paths used by the virtual machines 132 and 152. Alternately, the virtual machine path 210 may be a list of indexes of the network devices listed in the device table 520. The virtual machine path 210 may be dynamic and as one of the virtual machines 132 and/or 152 migrates to a different network segment the virtual machine path 210 may be updated accordingly.

The network detector 312 may further obtain device information of the network element or network device once it is determined that the virtual machine 132 depends on that device. The device information may contain information such as but not limited to a serial number, an IP address, product ID, and a device name. The information may also contain a port number that may be used by the virtual machine 132. The device information may further contain an identifier of the device specifically associated with the data center 110, such as a network element identifier allocated to every device in the data center 110. The network detector 312 may also identify the virtual machines being executed by the device. The network device is said to execute a virtual machine if the virtual machine uses that network device for operation of the virtual machine. The identified device information is stored in the device table 520. Thus, the device table 520 may contain a record for each network element containing device information indicating identity of the network element along with information regarding the virtual machines being executed by the network element.

Figure 4C:
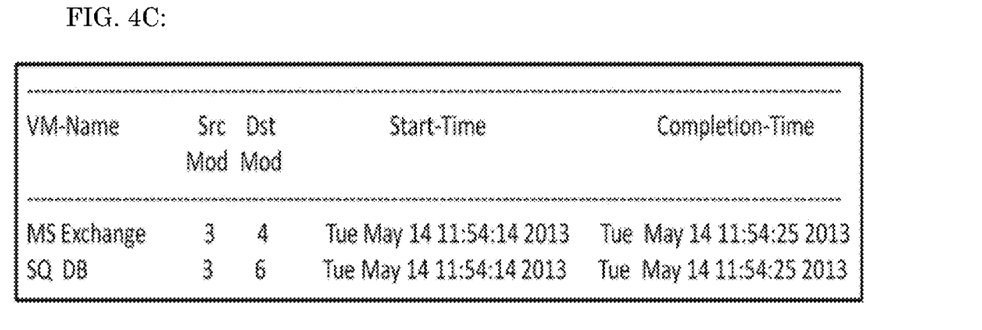

The virtual machine table 510 and the device table 520 may be updated by an external trigger. The external trigger may be caused by a change in resources allocated to the virtual machine 132. The external trigger may be caused by a new virtual machine being deployed in the data center 110 changing the resources allocation. Alternately, the external trigger may be a result of the virtual machine 132 being moved from one node of the datacenter 110 to another. The virtual machine 132 may be moved due to a scheduled maintenance at the node or due to unplanned failure/malfunction/indication of possible malfunction at the node. The virtual machine 132 may also be moved to a destination node because the destination node may provide better resources than a source node. For example, the virtual machine 132 may be compute-intensive and the destination node may be equipped with components better equipped to perform such computations. Alternately, the source node may be undergoing hardware or software maintenance and for business continuity the virtual machine 132 may be temporarily moved to the destination node. The virtual machine 132 may be restored on the source node after completion of the maintenance. The virtual machine 132 may be moved manually or by an automated process. In another example, the virtual machine 132 may still be executed by the node, but a network element in the node may be updated or replaced. For example, a switch connected to the virtual machine 132 may fail and may be replaced or communications through the failed switch may be routed through another switch in the data center 110. The network detector 312 may scan the network elements again to determine new network elements executing the virtual machine 132 and update any virtual machine paths for the virtual machine 132. The network detector 312 may detect the changes to the data center 110 via orchestration of the hypervisors at the network segments 112-116. The virtual machine detector 310 may maintain a log of changes to the virtual machine 132 as shown in FIG. 4C. The log may record changes to a location of the virtual machine 132. The log may also contain information such as the source node, the destination node, earlier device identifier, replacement device identifier and other information to determine what changed. The virtual machine detector 310 may also store timestamps as part of the log information. The reliability calculator 314 may reassess reliability of the virtual machine after such changes are complete.

Figure 6:
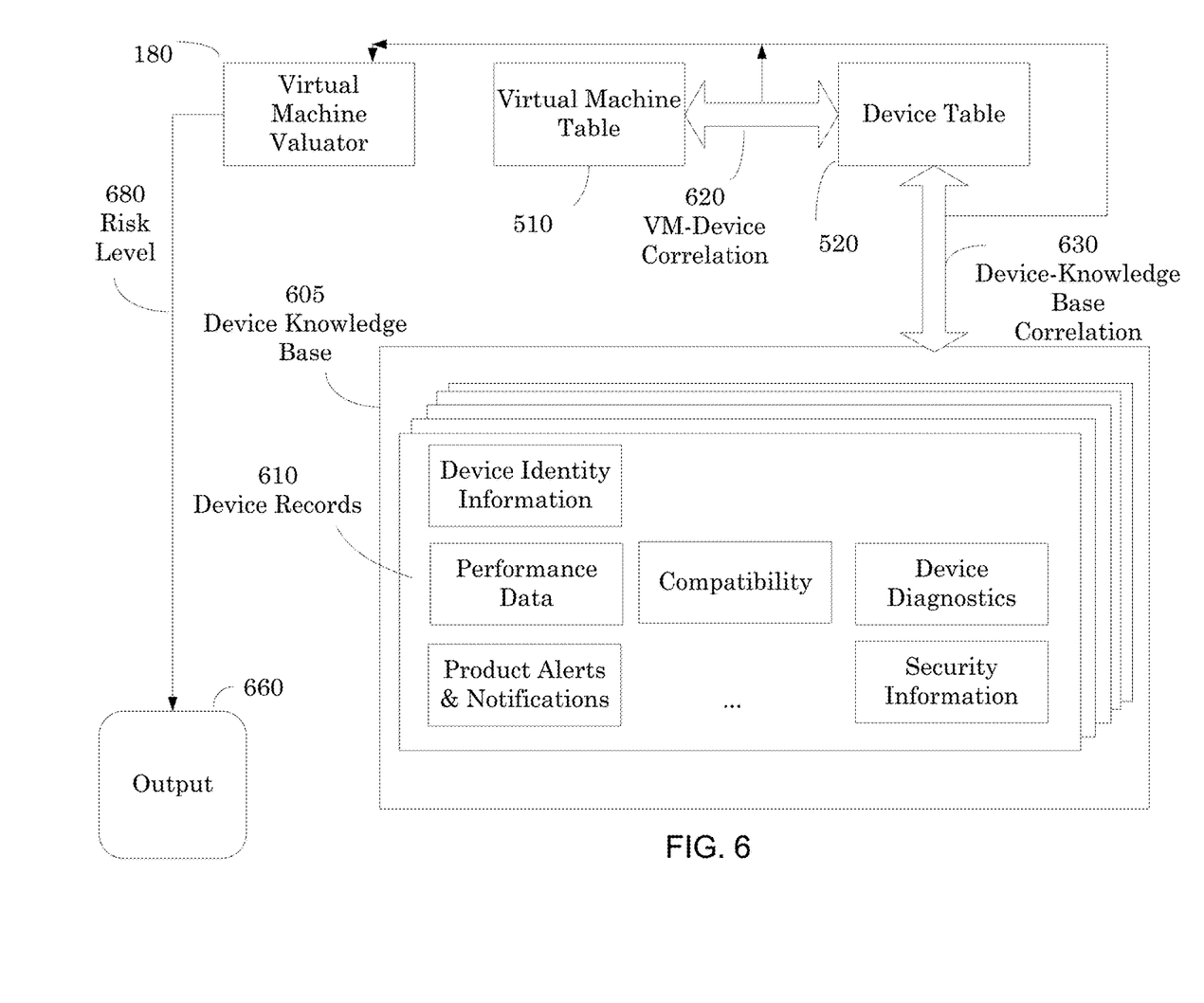
FIG. 6 is a block diagram illustrating another example data flow in a system for virtual machine risk monitoring.

As shown in FIG. 6, the reliability calculator 314 may calculate a risk level 680 associated with the virtual machine 132. The risk level 680 may indicate reliability or vulnerability of the virtual machine 132 to failure or other undesirable operational condition(s). Alternately or in addition, the risk level 680 may indicate a reliability or stability of the virtual machine 132. The risk level 680 may also indicate potential business impact or risk associated with the virtual machine 132 using the network elements of the virtual machine path 210. Alternately, or in addition, the risk level 680 may signify the risk associated with the virtual machine 132 being executed by the network segment 112. The stability, reliability or risk level 680 may be a measure to indicate ability to adjust to load changes, so that the virtual machine 132 continues to operate without any reduction in performance. The risk level 680 may also indicate a probability that the virtual machine 132 may fail, shut down, network vulnerabilities/exposures, perform at a lower level or have other such performance related issues.

The risk level 680 may be based on infrastructure vulnerabilities, product hardware and software alerts, or chokepoints associated with the network components or network devices of the data center 110. The risk level 680 may be determined based on the virtual machine table 510 and the device table 520. The risk level calculation may further use a device knowledge base 605. The device knowledge base 605 may be a collection of data records 610 containing data related to the vulnerabilities of the network elements that may be used in a data center environment, such as the data center 110. The device knowledge base 605 may also be referred to as knowledge base. A device record from the device records 610 may have performance data related to a network device used in the data center 110. The device record may contain performance data of the network device such as but not limited to performance information, defects, field notices, smart contracts, security vulnerabilities, software bugs, hardware bugs, and other information regarding the network device. The performance information may include information such as processor usage, memory usage, available memory, and other technical specifications of the network device. The data in the device record may, for example, be accumulated over several years either from a manufacturer, distributors, retailers, or consumer use of the network device. The device record may contain data from whitepapers, academic papers, online search results, online forums, customer feedback, customer service reports, product security response team (PSIRT) reports, and other sources. The data in the device record may be extracted from such sources and organized for ease of searching by using techniques such as indexing, tagging, crawling, or any other data organization techniques. The device record may be updated when new data is available from a source.

The reliability calculator 314 may determine the risk level 680 associated with the virtual machine 132 by accessing the device records 610 of the network elements being used by the virtual machine 132. Based on a virtual machine table-to-device table correlation 620, the reliability calculator 314 may determine the network elements in the virtual machine path 210 of virtual machine 132. Alternately, the correlation 620 may provide a network element and a list of virtual machines that depend on that network element. The correlation 620 may be based on the virtual machine MAC address or the VEM ID as described earlier. The correlation 620 may have been performed at an earlier time and stored in the memory 308. Further, based on a device table-to-device knowledge base correlation 630, the reliability calculator 314 may determine the data associated with the network elements being used by the virtual machine 132. Alternately, the reliability calculator 314 may use the data associated with a particular network element and may determine a risk factor associated with that particular network element. The reliability calculator 314 may then use the risk factor to update risk levels associated with the virtual machines supported by the particular network element. The virtual machines supported by the particular network element may be determined based on the correlation 620 between the virtual machine table 510 and the device table 520. The correlation 630 may be based on the device identity information contained in each of the device table 520 and the device record. Based on the determined data, the reliability calculator 314 may calculate the risk level 680 as a value from within a range of predetermined values indicating a level of vulnerability of the virtual machine 132 to failure or other undesirable operational condition(s). The predetermined range of values may be numbers, letters, symbols or any combination thereof that provides a comparative measurement of the robustness of a virtual machine with respect to other virtual machines in a data center and/or to a predetermined threshold. The predetermined threshold, may be, one or more thresholds that allow objective evaluation of the operational vulnerability of a particular virtual machine so that comparison of the importance of desired operation of the virtual machine can be correlated with the operational integrity of the hardware upon which the virtual machine operates.

The risk level 680 may then be sent to an output device 660. The output device 660 may be a computer, a pager, a mobile phone, a smartphone, a personal digital assistant, a telephone, a loudspeaker, or any other device capable to output the risk level 680. The output device 660 may also broadcast the risk level 680 to multiple devices via a wired or a wireless medium. As various operational parameters of the data center change, the risk level 680, may be dynamically updated accordingly. For example, upon failure of a hardware component of the data center, the risk level 680 of the virtual machines may be affected, or not affected in accordance with the network segment(s) associated with a respective virtual machine(s). Accordingly, an operator of a data center may be provided with a real time, dynamic indication of the reliability of each of the virtual machines in the data center. Similarly, indication of overloads, and/or other operational conditions of hardware within the data center, as well as projected overload or failure conditions can be reflected in the dynamically updated risk level 680 of the virtual machines.

Figure 7:
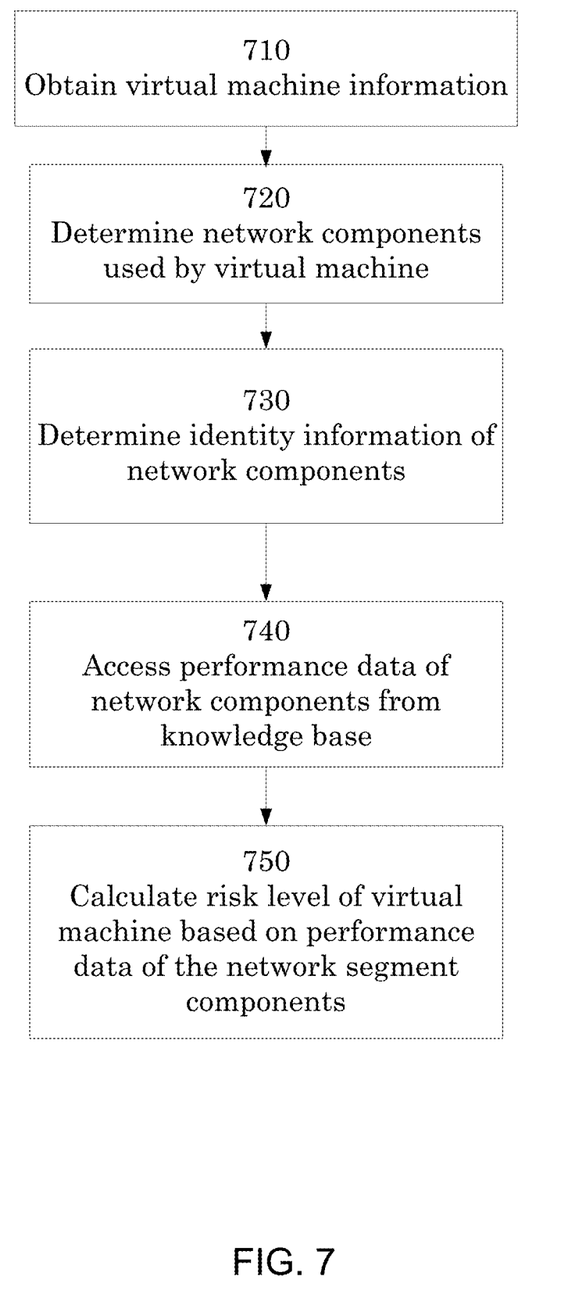
FIG. 7 is a flowchart illustrating an example flow of steps for calculating a risk level of a virtual machine.

FIG. 7 is an exemplary flow diagram of steps that may be performed in an example system 100. The steps indicated may be performed in any order; the order shown is just one example. Further, an example system 100 may perform additional or fewer steps than shown in FIG. 7. The virtual machine valuator 180, in step 710, may obtain the VM information. As described earlier, the VM information may be stored in the virtual machine table 510. The virtual machine valuator 180, in step 720, may determine the network elements or components of the data center 110 being used for execution of the virtual machine 132. The identity information of the network components may be obtained in step 730. As described earlier, the identity information of the network components, along with other related information may be stored in the device table 520. The virtual machine valuator 180 may access the device knowledge base 605 in step 740 to obtain the device records 610 of the network components being used by the virtual machine 132. The virtual machine valuator 180 may coordinate the data in the virtual machine table 510 and the device table 520 to determine which of the device records 610 are to be accessed. In step 750, based on the obtained device records 610, the virtual machine valuator 180 may calculate the risk level 680. The calculated risk level 680 may be output via the output device 660.

Figure 8:
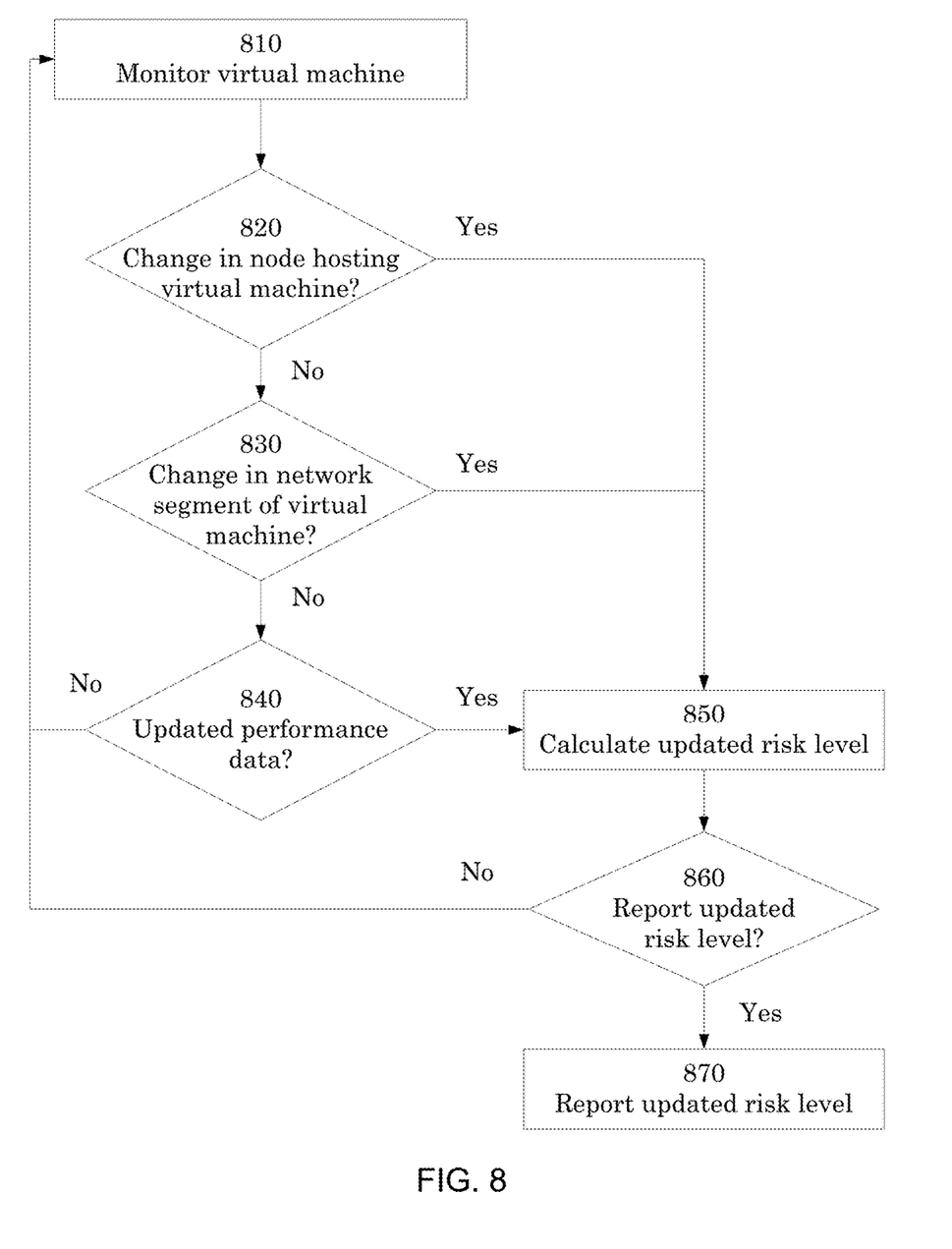
FIG. 8 a flowchart illustrating an example flow of steps performed by an example system for virtual machine risk monitoring.

FIG. 8 is an exemplary flow diagram of steps that may be performed in another example system 100. The steps indicated may be performed in any order; the order shown is just one example. Further, an example system 100 may perform additional or fewer steps than shown in FIG. 8. The virtual machine valuator 180, as shown in step 810, may monitor the virtual machine 132 to update the risk level 680 when a change is detected. In case the virtual machine 132 is moved to another node, the virtual machine valuator 180 may update the risk level 680 in step 850 as described earlier. A change in the network components being used by the virtual machine 132 may be detected in step 830 causing the risk level 680 to be re-calculated in step 850. Alternately, or in addition, the risk level 680 may be updated in step 850 if the device records 610 related to the virtual machine 132 are updated at the device knowledge base 605. The virtual machine valuator 180, in step 840, may monitor the device records 610 to detect the update to the device records 610. Alternately, the knowledge base 605 may send an indication to the virtual machine valuator 180 when the data records 610 are updated. The virtual machine valuator 180 may determine, in step 860, whether the updated risk level should be reported via the output device 660. The virtual machine valuator 180 may make this decision based on predefined settings in the virtual machine valuator 180. The virtual machine valuator 180 may report the updated risk level based on a comparison of the updated risk level value with the risk level 680 value. If the updated risk level value indicates a higher risk based on the comparison, the virtual machine valuator 180 may report the updated risk level value in step 870. The virtual machine valuator 180 may be configured to always report the updated risk level value. Alternately, or in addition, the virtual machine valuator 180 may report the updated risk level value in step 870 if the updated risk level value is greater (or lesser) than a predetermined threshold value, as discussed. In step 870, the virtual machine valuator 180 may indicate the updated risk level value with a message. The message may contain an explanation of the updated risk level value. The message may comprise a warning if the updated risk value is greater than a predetermined safe risk level value. Whether to report the updated risk level may also be determined based on a privilege level associated with a client that owns the virtual machine 132. The virtual machine valuator 180 may monitor the virtual machine 132 and update the risk level 680 continuously. Alternately, the risk level 680 may be updated periodically according to a predetermined schedule. In another example, or in addition, the risk level 680 may be calculated and output on demand in response to a request received by the virtual machine valuator 180.

The risk level 680 may be indicated in a reliability report of the virtual machine 132 that may be easier to comprehend. Alternately or in addition, the report may reflect an urgency with which the virtual machine 132 should be reconfigured. For example, the risk level 680 may be translated into a color to indicate vulnerability of the virtual machine 132. For example, red color may indicate very high risk or that immediate attention is suggested, while green color may indicate a healthy virtual machine that may be allowed to continue without immediate attention. A gradient color scale or any other color scheme may be used to indicate the risk level 680. Representing the risk level 680 may be done by other visualization techniques instead of colors, such as graphs, font size, audio tones, icons or any other visualization techniques. A combination of visualization techniques may also be employed for representing the risk level 680. As described earlier, the report may be broadcast to users and/or administrators of the virtual machine 132.

In an example system 100, the virtual machine 132 may be moved from the source node in the data center 110 to the destination node in the data center 110. The virtual machine 132 may have a service level contract (SLA). The move may be occurring during a maintenance window at the data center 110. The virtual machine valuator 180 may detect the change in the virtual machine 132 and identify the device records 610 related to the network components being used by the virtual machine 132 after migration to the destination node. The virtual machine valuator 180 may calculate the updated risk level or stability based on the device records 610. The virtual machine valuator 180 may further analyze the updated risk level and generate the reliability report of the virtual machine 132. The virtual machine valuator 180 may also determine if the SLA is being honored. The virtual machine valuator 180 may compose an output message with the report and other information relevant to the migration. The virtual machine valuator 180, in the output message, may also suggest an alternate node to execute the virtual machine based on the updated reliability of the virtual machine at the destination node. The reliability may be lower than a predetermined threshold value or lower than the earlier reliability value at the source node. Alternately, the reliability may be outside a predetermined range. The virtual machine valuator 180 may further provide a predicted reliability value of the virtual machine at the alternate node. The alternate node would be suggested based on the predicted reliability value being greater than the predetermined threshold value or greater than the updated reliability value.

In yet another example system 100, the virtual machine 132 may be reconfigured automatically in response to the reliability changing to a value below a predetermined threshold. The reconfiguration may involve migration of the virtual machine 132 to the alternate node. Alternately or in addition, the virtual machine path 210 may be modified such that the reliability associated with the virtual machine 132 may be restored compared to the predetermined threshold value. The modification to the virtual machine path 210 may involve substituting one or more network devices in the virtual machine path 210 with other network devices existing in the data center. Migration of the virtual machine 132 to the alternate node may result in modification of the virtual machine path 210. The reconfiguration may further involve modifying a network device associated with the virtual machine, such as updating the network device with latest firmware, hardware part, or replacing the network device with a newer version of the network device.

The output message may be output via the output device 660. Thus, the virtual machine valuator 180 may provide actionable intelligence rather than simply indicating a device failure to users and/or administrators of the virtual machine 132. Remediation steps to improve the reliability or the risk level 680 of the virtual machine 132 may be taken based on the output message.

Various embodiments described herein can be used alone or in combination with one another. The foregoing detailed description has described only a few of the many possible implementations of the present disclosure. For this reason, this description of example embodiments is intended by way of illustration, and not by way of limitation.

We claim:

1. A device comprising:
    a virtual machine detector configured to determine identity information of a virtual machine residing at a first node in a data center;
    a network detector configured to:
        query physical network devices in a network segment of the data center on which the virtual machine currently resides based on a media access control (MAC) address of the virtual machine to identify particular physical network devices in the data center that form a data path currently used by the virtual machine;
        identify other virtual machines in the data center being executed by the particular physical network devices;
        determine identity information of the particular physical network devices; and
        store in memory the identity information of the particular physical network devices;
    a reliability calculator configured to:
        access device records of the particular physical network devices from a knowledge base based on the identity information of the particular physical network devices, wherein each device record comprises performance data relating to at least one of: security threats, known defects, field notices, smart contracts, software bugs, hardware bugs, or performance information;
        determine a current risk level of the virtual machine based on the identity information of the particular network devices, the device records, and the identity information of the virtual machine; and
        determine other risk levels for each of the other virtual machines; and
    an output device configured to:
        output the current risk level of the virtual machine, the risk level providing a comparative measure of robustness of the virtual machine as compared to the other virtual machines
        modify the data path to the first node by substituting one or more network devices of the particular physical network devices for other physical network devices included in the network segment of the data center, wherein the one or more network devices are selected for the substituting based on the current risk level of the virtual machine and the other risk levels of the other virtual machines.

2. The device of claim 1, wherein the network segment is a first network segment, and wherein:
    the reliability calculator is further configured to monitor migration of the virtual machine from the first network segment to a second network segment;
    the network detector is further configured to determine identity information of network devices comprising the second network segment; and
    the reliability calculator is further configured to update the risk level of the virtual machine in response to the migration of the virtual machine.

3. The device of claim 2, wherein the network detector is further configured to:
    update the memory with the identity information of the network devices of the second network segment in response to the migration of the virtual machine to the second network segment.

4. The device of claim 1, wherein the network detector is further configured to:
    discover the physical network devices in the network segment with a neighbor discovery process.

5. The device of claim 4, wherein querying the network devices further comprises:
    identifying the data path from a unicast route information base data for the virtual machine using the MAC address of the virtual machine.

6. The device of claim 1, wherein the virtual machine detector is further configured to:
    monitor the virtual machine; and
    generate and update the identity information of the virtual machine based on the monitoring, wherein the identity information is indicative of virtual machine health and allows the virtual machine detector to determine a media access control (MAC) address of the virtual machine.

7. The device of claim 1, wherein, in querying, the network detector is further configured to:
    compare the MAC address of the virtual machine with unicast forwarding information from the physical network components.

8. A method comprising:
    identifying, by a processor, a plurality of virtual machines being executed in a data center;
    determining identity information of a virtual machine from among the plurality of virtual machines residing at a node in the data center;
    querying, by the processor, physical network components in the data center based on a media access control (MAC) address of the virtual machine to identify particular physical network components in the data center forming a virtual machine path currently used by the virtual machine;
    identifying other virtual machines of the plurality of virtual machines being executed by the particular physical network components;
    determining identity information of the particular physical network components;
    recording, by the processor, in a virtual machine database the identity information of the virtual machine and the identity information of the particular physical network components forming the virtual machine path;

accessing device records of the particular physical network components from a knowledge base based on the identity information of the particular physical network components, wherein each device record comprises performance data relating to at least one of: security threats, known defects, field notices, smart contracts, software bugs, hardware bugs, or performance information;

determining a current risk level of the virtual machine based on the identity information of the particular physical network components, the device records, and the identity information of the virtual machine;

determining other risk levels for each of the other virtual machines; and modifying the virtual machine path to the node by substituting one or more network components of the particular physical network components currently forming the virtual machine path for other physical network components included in the data center, wherein the one or more network components is selected for the substituting based on the current risk level of the virtual machine and the other risk levels of the other virtual machines.

9. The method of claim 8, further comprising:
reporting, by the processor, the risk level of the virtual machine to an output device.

10. The method of claim 8, wherein the virtual machine path is a first virtual machine path, the risk level is a first risk level, and the method further comprises:
monitoring, by the processor, a trigger causing the virtual machine to use a second virtual machine path within the data center;
determining, by the processor, a second risk level of the virtual machine based on at least device records of physical network components forming the second virtual machine path; and
issuing, by the processor, a warning message indicating an increased risk level of the virtual machine in response to the second risk level being greater than the first risk level.

11. The method of claim 8, wherein the querying to identify the particular physical network components further comprises:
comparing the MAC address of the virtual machine with unicast forwarding information from the physical network components.

12. The method of claim 8, wherein the network segment is a first network segment, and the method further comprises:
monitoring a migration of the virtual machine from the first network segment to a second network segment;
determining identity information of network components comprising the second network segment; and
updating the risk level of the virtual machine in response to the migration of the virtual machine.

13. The method of claim 8, further comprising:
discovering the physical network components in the data center with a neighbor discovery process.

14. A non-transitory computer readable media comprising instructions executable by a processor, the non-transitory computer readable media comprising instructions operable to cause the processor to:
determine identity information of a virtual machine being executed by a node of a data center;
query physical network components in the data center based on a media access control (MAC) address of the virtual machine to identify particular physical network components forming a virtual machine path currently used by the virtual machine;
identify other virtual machines being executed by the particular physical network components;
determine identity information of the particular physical network components;
access device records of the particular physical network components from a knowledge base based on the identity information of the particular physical network components, wherein each device record comprises performance data relating to at least one of: security threats, known defects, field notices, smart contracts, software bugs, hardware bugs, or performance information;
determine a current risk level of the virtual machine based on the device records, the identity information of the particular physical network components in the virtual machine path, and the identity information of the virtual machine;
determine other risk levels for each of the other virtual machines; and
modify the virtual machine path to the node by substituting one or more network components of the particular physical network components currently forming the virtual machine path for other physical network components included in the data center, wherein the one or more network components is selected for the substituting based on the current risk level of the virtual machine and the other risk levels of the other virtual machines.

15. The non-transitory computer readable media of claim 14,
wherein the virtual machine path is modified in response to the current risk level of the virtual machine being above a predetermined range.

16. The non-transitory computer readable media of claim 14, further comprising instructions operable to cause the processor to:
detect the current risk level of the virtual machine and the other risk levels of the other virtual machines in response to an update to the device records.

17. The non-transitory computer readable media of claim 14, wherein the physical network components comprise:
layer 2 network components comprising at least one of a switch, a router, or a network interface card.

18. The non-transitory computer readable media of claim 14, wherein the network segment is a first network segment, and the instructions are further operable to cause the processor to:
monitor a migration of the virtual machine from the first network segment to a second network segment;
determine identity information of network components comprising the second network segment; and
update the risk level of the virtual machine in response to the migration of the virtual machine.

19. The non-transitory computer readable media of claim 14, further comprising instructions operable to cause the processor to:
discover the physical network components in the data center with a neighbor discovery process.

20. The non-transitory computer readable media of claim 14, wherein the instructions operable to query further comprise instructions operable to cause the processor to:
compare the MAC address of the virtual machine with unicast forwarding information from the physical network components.

* * * * *